May 11, 1965     R. R. DE BOLT     3,183,065

MIXING AND REACTION APPARATUS

Filed March 1, 1961

INVENTOR
RICHARD R. DE BOLT
BY
ATTORNEYS

United States Patent Office 3,183,065
Patented May 11, 1965

3,183,065
MIXING AND REACTION APPARATUS
Richard R. De Bolt, Pinole, Calif., assignor to California Research Corporation, San Francisco, Calif., a corporation of Delaware
Filed Mar. 1, 1961, Ser. No. 92,699
1 Claim. (Cl. 23—285)

The present invention relates to an improved process and apparatus for effecting mixing between a plurality of fluids and, more particularly, to an improved process and apparatus for contacting a plurality of fluid reactants in a reaction zone in such a manner that a homogeneous reaction mixture is obtained.

The plurality of fluids with which the present invention is concerned may comprise a plurality of liquids, or at least one liquid and one gas or vapor, or a plurality of gases or vapors.

It frequently is desirable in chemical processing to form simple mixtures of a plurality of fluids with a sufficient degree of mixing to obtain a desired concentration and homogeneous distribution of each component in the mixture. It also frequently is desirable in chemical processing to form from a plurality of fluid reactants a reaction mixture under conditions of mixing turbulent enough to secure homogeneity and thus to adequately minimize the necessity for substantial excesses of reactants over the stoichiometric quantities. In either case, complicated and expensive mixing and reaction equipment, necessarily motor driven in many cases, frequently is necessary. It is an object of the present invention to provide an improved process and apparatus for accomplishing the foregoing types of chemical processing efficiently and inexpensively without the necessity for such complicated and expensive equipment.

In accordance with the present invention, there is provided a process and apparatus for effecting fluid mixing, including reactions between fluid reactants, by passing a plurality of fluids to be mixed and/or reacted together into a substantially enclosed mixing chamber to form a substantially homogeneous mixture of said fluids as such and/or reaction products thereof, ejecting said mixture through at least one restricted passageway from said chamber into a mixture container substantially larger than said chamber and having at least wall portion and a bottom portion surrounding said chamber, in a direction and at a velocity such that further mixing takes place in said container. In accordance with a preferred aspect of the present invention, there is provided a reactor for effecting contact and mixing between at least two streams of reactants or mixture components, which comprises a relatively confined mixing chamber within a substantially larger liquid product container, means for passing said reactants into contact within said chamber and means for passing fluid reaction products from said chamber into said container.

For convenience, the present invention will be explained in terms of ammonium nitrate manufacture from ammonia vapor and nitric acid. With an understanding of the application of the present process and apparatus for such manufacture, a man skilled in the art will have no difficulty in understanding how the process and apparatus may be applied in other areas of chemical processing, for example, in the production of ammonium sulfate from ammonium hydroxide and sulfuric acid, and in the production of chromic acid from potassium chromate and sulfuric acid.

Ammonium nitrate conventionally is manufactured by physical contact of ammonia vapor and nitric acid in an appropriate reaction vessel. The ammonia and nitric acid reactants are released below the surface of the ammonium nitrate solution. Unless excellent mixing takes place in the reaction vessel, so that accurate analysis of the product is possible, which generally is not the case, it is impossible to limit the quantities of reactants used to the stoichiometric quantities. When conventional flow measurement equipment has been used in an attempt to introduce stoichiometric quantities of reactants to the reaction zone, because of fluctuations in pump rates and/or changes in the reactants, control is generally on the basis of analysis of the product reaction mixture, followed by resulting regulation, manual or otherwise, of the relative rate of introduction of the several reactants. In such a method, inhomogeneities in the product mixture result in repeated errors in control, with resultant hunting, swings in flow rate, and intolerable fluctuations around the proper stoichiometric quantities.

The art has attempted to meet this problem by deliberately using an excess of ammonia to ensure that sufficient ammonia was present to react with all of the nitric acid. However, because the unreacted excess of ammonia was boiled off and lost during the process, this approach has been economically unattractive.

Because the foregoing ratio flow control approach has resulted in the described loss of ammonia and attendant economic disadvantages, it would be preferable to control the ratio of reactants automatically on the basis of continuous analysis of the product ammonium nitrate solution to determine the degree of reaction that has taken place. Such analysis could be a continuous pH measurement of the effluent stream of ammonium nitrate solution leaving the system. This continuous measurement might be made in any of a number of different ways known to the art; for example, using the titration process and apparatus described on pages 19–1 of "The Industrial pH Handbook," Backman Instruments, Inc., 1957, Fullerton, California, and also in U.S. Patent 2,884,365. However, as is well known, the quality of such a pH measurement is highly dependent upon the attainment of excellent mixing in the reactor and a homogeneous effluent reaction product stream. Such excellent mixing could be obtained by the use of a mechanical mixer and/or an external circulation pump. However, such facilities, in addition to a high initial cost, present severe maintenance problems, which are exaggerated to an intolerable degree as the corrosivity of the reactants and/or reaction mixture increases. The process and apparatus of the present invention provides convenient solutions for the foregoing problems that have been faced by the art.

The essential features of the present invention are set forth with particularity in the appended claim. The invention will best be understood, however, both as to organization and operation, and additional objects and advantages thereof will be apparent from the following description of a specific embodiment directed to ammonium nitrate manufacture when read in conjunction with the accompanying drawings in which:

Figure 1:
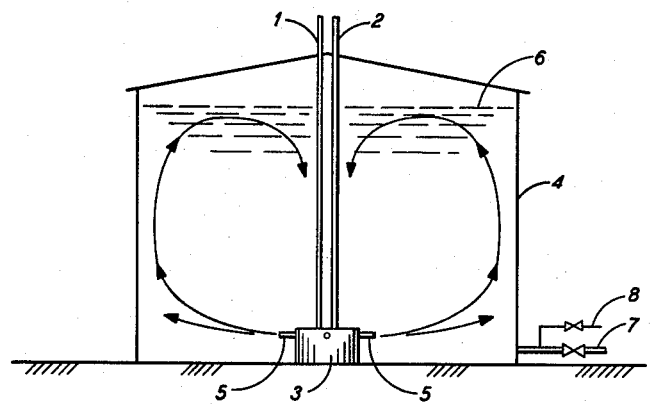
FIGURE 1 is a sectional elevation view of apparatus constructed in accordance with the present invention.

Referring now to FIGURE 1, nitric acid is passed through line 1 and ammonia is passed through line 2 into inner mixing chamber 3 located in tank or reaction product container 4. Substantially all of the reaction between the nitric acid and the ammonia takes place in inner reaction chamber 3, and the resulting reaction products are passed from inner reaction chamber 3 through passageways 5 into product mixture container 4 proper. Passageways 5 preferably are so constructed and arranged as to cause circulatory currents in the body of liquid ammonium nitrate reaction mixture 6 in the direction shown by the arrows. Ammonium nitrate may be withdrawn from container 4 through line 7 as desired. Continuous pH measurement may be made if desired, as discussed above, on a bleed stream of reaction product withdrawn from container 4 through line 8.

Figure 2:
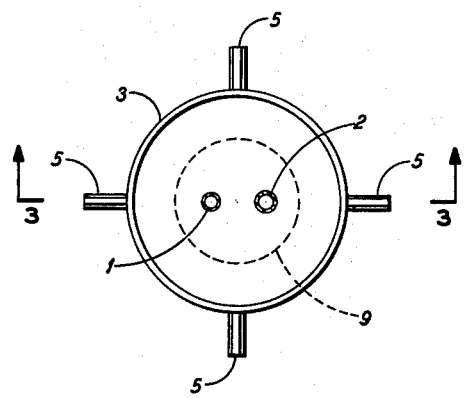
FIGURE 2 is a plan view of the inner reaction chamber shown in FIGURE 1.

Referring now to FIGURE 2, a plan view of inner reaction chamber 3 is shown, with passageways 5 arranged in a preferred radial fashion. Passageways 5 desirably are relatively short pipes, to act as nozzles to direct the reaction mixture emanating from reaction chamber 3 in a manner that will provide the desired circulatory currents within the liquid bed of ammonium nitrate reaction product located in container 4 surrounding reaction chamber 3. Lines 1 and 2 lead separately into reactor chamber 3 as shown; however, it is possible that, in some circumstances, a single line may be provided to convey a fluid mixture into chamber 3 for additional mixing, or that additional lines might be used, for example, for introduction of additional water of dilution, over and above that liberated in the reaction.

Figure 3:
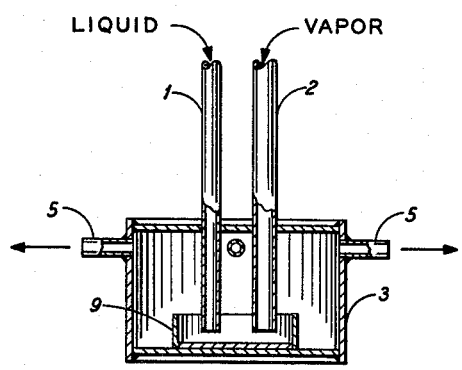
FIGURE 3 is a cross-sectional view of the reaction chamber of FIGURE 2 taken in the direction of the arrows 3—3 in FIGURE 2.

Referring now to FIGURE 3 and the cross-sectional view of inner mixing chamber 3 there shown, a receptacle 9 constructed as shown will increase the efficiency of mixing and/or reaction in chamber 3. As the nitric acid and ammonia vapor pass through lines 1 and 2 respectively into receptacle 9 located within chamber 3, the resulting reaction between the nitric acid and the ammonia vapor results in an ammonium nitrate reaction product in solution. Those skilled in the art will understand that lines 1, 2 and 5, and chamber 3, desirably will be so sized that chamber 3 will substantially fill with ammonium nitrate reaction product in solution and also steam, and that this product will discharge through passageways 5 at a rate which will be balanced by the rate of introduction of nitric acid and ammonia through lines 1 and 2, and at a velocity sufficient to provide the desired circulatory currents within the body 6 of ammonium nitrate reaction product in solution in container 4 proper.

Those skilled in the art will further understand that the nitric acid and ammonia vapor, or other fluids, as the case may be, introduced into chamber 3 may be introduced at any desired rates or pressures. These desired rates and pressures will, of course, vary depending upon the fluids employed and the results desired, and are considered to be within the skill of the art. In connection with pressure, it is noted that in the case of ammonium nitrate manufacture, the reaction between nitric acid and ammonia vapor is highly exothermic so that the product water is converted to steam in part. This results in a pressure increase in reaction chamber 3, which is conducive to excellent contacting and vigorous expulsion of reaction product through passageways 5, with accompanying vigorous circulatory action within the body 6 of ammonium nitrate reaction product in solution in container 4 proper, and production of a homogeneous liquid phase in said container.

As discussed above, a bleed stream of ammonium nitrate product withdrawn from container 4 through line 8 may be continuously analyzed; for example, by pH measurement, and the resulting analysis used indirectly, or directly and automatically, to control the proportions of the fluids entering lines 1 and 2.

Particularly as applied to ammonium nitrate manufacture, the apparatus of the present invention provides a relatively confined mixing chamber within a substantially larger liquid product container and provides means for passing the reactants into contact within said chamber and a means for passing fluid reaction products from said chamber into said container in such a manner that a desirable mixing pattern is produced in the bed of liquid product in said container proper. It will be appreciated that the physical shapes of the inner reaction chamber, the nozzle configuration and the outer product container could be varied widely, partially depending upon the desired degree of mixing turbulence in each space. Although a preferred arrangement involves placing the inner reaction chamber at the center and at the bottom of the external product container and involves four nozzles communicating between the two spaces for ejecting ammonium nitrate solution and vapor mixture in radial directions into the external container proper, those skilled in the art with the foregoing explanation will be able to determine other equipment arrangements that may be used without departing from the spirit of the invention.

Those skilled in the art also will realize that care should be taken in selecting materials of construction to withstand corrosive reactions at operating temperatures and pressures. In such exothermic reactions, such as the ammonium nitrate manufacture reaction discussed above, the inner reaction chamber temperature will be higher than that of the external product container and will operate at a higher pressure. Particularly in the specific embodiment discussed above, it is important that the size and shape of the inner reaction chamber should be such that simple fabrication of the chamber from corrosion-resistant material is possible, and such that the reaction chamber is of minimum size consistent with the desired reaction. The design of the chamber should be such that turbulent mixing takes place in all portions thereof, to preclude passage of any unreacted materials into the external container proper and to preclude the accumulation of quiescent pockets of solids or vapors. The inner reaction chamber exit nozzles should be so sized as to obtain a maximum jet velocity without exceeding an internal pressure in the chamber which would limit the desired feed rates of reactants to the chamber. If desired in any particular process, inert gas or liquids may be introduced into the inner reaction chamber, for example, to provide cushioning to prevent vapor hammering or to reduce operating temperatures consistent with a given reaction chamber total pressure.

From the foregoing, it may be seen that the present invention solves a number of heretofore unsolved problems that have been faced by the art, particularly in that it provides a method and apparatus for accomplishing fluid mixing and/or chemical reaction in a highly turbulent manner and with production of a reaction mixture which is adequately homogeneous to permit good control of the reactant charging rates. Thus, it is made possible to avoid complicated and expensive mixing equipment while at the same time avoiding economic losses resulting from use of excess quantities of one or more of the reactants in an effort to gain control of the reaction and prevent production of off-test or corrosive product.

Although only specific arrangements and modes of construction and operation of the present invention have been described and illustrated, numerous changes could be made in these arrangements and modes without departing from the spirit of the invention, and all such changes that fall within the scope of the appended claim are intended to be embraced thereby.

I claim:

A reactor for effecting contact between at least one gaseous reactant and at least one liquid reactant, which comprises:

(1) a liquid product container having wall portions and a bottom portion;

(2) a substantially smaller, substantially enclosed, mixing chamber for mixing said reactants, located within said product container at the bottom thereof, at approximately the center of said bottom portion;

(3) an open top container disposed in the bottom of said mixing chamber;

(4) two inlet conduits for said reactants, extending into said mixing chamber and said open top container to a location adjacent the bottom of said open top container;

(5) a plurality of outlet conduits of continuous dimension located adjacent the top of said mixing chamber and in communication between said mixing chamber and said container for passing fluid reaction products from said chamber into said container,
  (a) said outlet conduits being so restricted in cross sectional area and so disposed as to direct reaction products in jets from said chamber into said container and thereby to cause substantial circulatory currents within accumulated fluid reaction products in said container; and
(6) outlet means located in said product container through which products can be removed.

References Cited by the Examiner

UNITED STATES PATENTS

| | | | |
|---|---|---|---|
| 695,399 | 3/02 | Kinsey | 261—124 |
| 1,322,597 | 11/19 | Millard | 261—124 |
| 2,528,094 | 10/50 | Walker | 259—4 |
| 2,702,280 | 2/55 | Mackinnon | 23—285 X |
| 2,888,322 | 5/59 | Podschus et al. | 23—110 |
| 2,965,471 | 12/60 | Stassfort | 71—64 X |
| 3,011,875 | 12/61 | Sumner | 71—64 X |

MORRIS O. WOLK, *Primary Examiner.*

JAMES H. TAYMAN, Jr., *Examiner.*